United States Patent [19]

Smiley

[11] 4,145,477

[45] Mar. 20, 1979

[54] RIGIDIZED ACRYLIC ARTICLES AND METHOD

[75] Inventor: Leonard H. Smiley, Jenkintown, Pa.

[73] Assignee: Rohm and Haas Company, Philadelphia, Pa.

[21] Appl. No.: 522,383

[22] Filed: Nov. 11, 1974

[51] Int. Cl.² ............................................. B32B 17/10
[52] U.S. Cl. ................................... 428/441; 428/515; 428/539
[58] Field of Search .................. 260/42.18, 42.44, 885; 428/297, 303, 394, 515, 520, 292, 359, 361, 920, 441, 539

[56] References Cited

U.S. PATENT DOCUMENTS

| | | | |
|---|---|---|---|
| 2,464,826 | 3/1949 | Neher et al. | 428/520 |
| 3,442,851 | 5/1969 | McManimie | 260/42.18 |
| 3,607,615 | 9/1971 | Hatakeyama | 428/520 |
| 3,780,156 | 12/1973 | Cameron | 264/300 |
| 3,833,404 | 9/1974 | Sperling et al. | 428/520 |

*Primary Examiner*—James J. Bell
*Attorney, Agent, or Firm*—Michael B. Fein; Lester E. Johnson

[57] ABSTRACT

Compositions which cure at room temperature comprising an acrylic polymer dissolved in an acrylic monomer, a cross-linking monomer, hydrated alumina, fibrous reinforcement, a free radical catalyst and a catalyst promoter for use in rigidizing acrylic sheet and gel coats.

7 Claims, No Drawings

RIGIDIZED ACRYLIC ARTICLES AND METHOD

This invention relates to a rigidizing systems for acrylic sheet or gel coats. Prior rigidizing systems have usually been based on unsaturated polyester with styrene monomer, containing filler and fibrous reinforcement. These systems are generally sprayed onto the back of thermoformed acrylic sheet or gel coats, and cured at room temperature, resulting in articles which have been used for a wide variety of purposes, such as sinks, bathtubs, shower stalls, automobile exterior parts, sailboats, and many others. For certain applications these prior systems did not meet the demands of commerce in that when exposed to flame the polyester back coat delaminated and increased the contact of the acrylic with oxygen on its second side. Also, the burning polyester created a severe smoke problem, resulting in the articles so made being unable to pass fire code requirements.

It is an object of the present invention to provide compositions for rigidizing acrylic sheet or gel coats which result in improved rigidized articles.

A further object is to provide improved rigidized acrylic articles or gel coats.

A still further object is to provide a process for rigidizing acrylic sheet or gel coats which results in improved articles.

These objects, and others which will become apparent, are achieved by the present invention which comprises compositions for rigidizing acrylic sheet or gel coats which cure at room temperature comprising acrylic polymer dissolved in acrylic monomer, a cross-linking monomer, hydrated alumina, fibrous reinforcement, free radical catalyst and a catalyst promoter. In another aspect the invention comprises a method of rigidizing acrylic sheet or gel coats comprising applying to one side of said sheet or gel coat the composition mentioned above and curing at room temperature. In another aspect the invention comprises the articles produced by this method.

The acrylic sheet can be any used in the art, for example, any of the grade of Plexiglas ® brand acrylic sheet. The sheet can be cast or extruded, with or without an impact modifier. The sheet can also contain a flame retardancy additive.

The sheet can be thermoformed into the shape desired such as a sink or bathtub. Sheet thicknesses on the order of 60 to 80 mils. are preferred, but it should be noted that upon thermoforming the sheet thickness is reduced to as low as about 20 mils. in certain areas.

The composition is then applied to one side, usually the back or non-exposed side, of the thermoformed sheet and allowed to cure at room ("ambient") temperature. Exposure of the composition to elevated temperatures to cure is not necessary with this invention. The composition indicates when it is cured by whitening, which is a particular advantage versus prior systems which had to be touched to determine when cured.

The acrylic polymer is polymerized from any lower alkyl methacrylate, mixture thereof, or mixtures with other ethylenically unsaturated compounds such as vinyl acetate, styrene, alkyl acrylates, multifunctional monomers such as alkylene dimethacrylates or diacrylates, etc. In addition it is highly preferred to further include a minor amount of an unsaturated acid such as acrylic acid or methacrylic acid in the mixture which copolymerizes with the other monomer or monomers.

The presence of the acid moiety in the thermoplastic polymer has unexpectedly been found to promote wet-out of the alumina hydrate and facilitate the use of larger amounts of this flame-retardant additive. Preferably the acrylic polymer is a methyl methacrylate/ethyl acrylate/methacrylic acid copolymer.

The acrylic monomer is selected from lower alkyl methacrylate, or mixtures thereof or mixtures with minor amounts of lower alkyl acrylates, acrylonitrile, or non-acrylic unsaturated monomers. In addition, it is highly preferred that the monomer system contain 1 to 75% by weight based on resin of an unsaturated acid such as acrylic acid or methacrylic acid. The presence of this unsaturated acid which reacts during polymerization of the other monomers has unexpectedly been discovered to increase adhesion of the polymerized rigidizing composition to the acrylic sheet.

The acrylic thermoplastic polymer preferably comprises about 5 to 50 percent by weight of the resin system, defined as the polymer in monomer solution and the cross-linking monomer. The cross-linking monomer comprises about 0.01 to 25 percent by weight of the resin system, and the monomer is the remainder.

The cross-linking monomer is any polyethylenically unsaturated compound, for example alkylene diacrylates, triacrylates, dimethacrylates, and trimethacrylates such as ethylene glycol dimethacrylate, propylene glycol dimethacrylate, propylene glycol dimethacrylate, polyethylene glycol dimethacrylate, trimethylol propane dimethacrylate, and the like; divinyl benzene triallyl cyanurate, diallylphthalate, and the like.

A free radical catalyst/catalyst promoter system which enables room temperature cure is an important feature of the invention. Peroxy or azo free radical catalysts are used in conjunction with promoters such as N,N-hydroxyethyl-P-toluidine and cobalt naphthenate are exemplary. A preferred system is acetyl peroxide with N,N-hydroxyethyl-p-toluidine, from about 0.1 to 3% each by weight based on resins.

Powdered silica can also be included for thixotropy.

The fibrous reinforcement is mixed with the resin system before or during application to the acrylic sheet, usually during spraying using conventional equipment which simultaneously chops the fibers and sprays at the same time. The fibers are preferably glass and have an average length of about 0.1 to 3.0 inch. The amount of fiber is preferably about 10 to 25% by weight based on resin, filler, and fiber.

The hydrated alumina is in particulate form with a particle size ranging from 0.1 to about 10 microns are preferred. Mixtures of different particles can be used if so desired.

The hydrated alumina filler comprises about 40 to 80% by weight of the resin, fiber, and filler. The higher the amount, the better the flame retardance. With prior polyester systems, an upper limit of about 45% by weight hydrated alumina was the most which could be incorporated in a practicable system; with the acrylic system of the present invention, significantly higher amounts of this filler have been successfully incorporated, resulting in improved flame-retardancy.

A preferred process for making the rigidized composites of the invention is to (1) thermoform the acrylic sheet to the desired shape, (2) allow the thermoformed sheet to cool, (3) mix the resin system and hydrated alumina, catalyst promoter, and minor additives, (4) simultaneously spray onto the back of the acrylic sheet the mixture from the previous step with free radical catalyst and fiber which is being continuously chopped from long strands, (5) allowing the sprayed coating to polymerize at room temperature.

The time to gel is typically about 15 minutes, and time to completely cure is about 1 to 2 hours. The rigidizing system typically whitens when it is cured.

The following examples are presented to illustrate a few embodiments of the invention but should not be considered as limting the invention in any way. Parts and percentages are by weight unless otherwise indicated.

EXAMPLE 1

| Component | Parts by Weight |
|---|---|
| Methyl Methacrylate (MMA) monomer | 70 |
| Polymethyl Methacrylate (PMMA) of molecular weight 65,000 | 20 |
| Trimethylolpropane Trimethacrylate | 10 |
| N,N Hydroxyethyl-p-Toluidine | 1.0 |
| Cobalt Napththenate | 0.6 |
| Powdered Silica | 0.6 |
| Paraffin wax (MP = 133° F.) | 1.0 |
| Hydroquinone | 0.001 |

The viscosity of the resin was 125 cps.

EXAMPLE 2

Thirty-five parts of the above resin was mixed with 65 parts by weight of Alcoa C-331 hydrated alumina using a Cowles mixer. The viscosity of the paste was 2,000 cps and it had a thixotropic index of 2.1.

EXAMPLE 3

The resin prepared in Example 2 is sprayed onto an acrylic sheet (polymethyl methacrylate) using a Glas-Mate spray-up unit which mixed fiberglass and peroxide catalyst at the same time. The catalyst (1.0% on resin) is methylethyl ketone peroxide, and the fiberglass is Owens-Corning Fiberglass No. 825, 1¼" length. The layer of filled glass reinforced acrylic resin is completely cured in two hours.

EXAMPLE 4

A. A mixture of 20 parts of a thermoplastic polymer of MMA, ethyl acrylate (EA), and methacrylic acid (MAA) in the monomer ratio 84/12/2 dissolved in 57 parts MMA and 3 parts MAA with 23 parts ethylene glycol dimethacrylate as crosslinking monomer, 2 parts N,N-hydroxy ethyl-p-toluidine as catalyst promoter, 0.3 parts paraffin wax and 0.005 parts hydroquinone is prepared.

B. For comparative purposes a conventional general purpose unsaturated polyester-styrene monomer system of medium reactivity, Selectron 58094 sold by PPG Industries, Inc., having the composition maleic/orthophthalic acid-diethylene/dipropylene glycol polyester and styrene monomer in a 60:40 ratio is prepared.

C. The resin systems of 4A and 4B above are mixed with various amounts of hydrated alumina and 15% fiberglass and cured. The oxygen index and smoke density of the composites when burned are determined as shown in Tables I and II respectively.

The smoke density is measured in accordance with ASTM-2843. Higher values indicate greater smoking of the burning test material.

The oxygen index is a measure of the volume % of oxygen necessary to support combustion. Greater oxygen indices indicate less potential for burning.

TABLE I

| | Oxygen Index of Glass Reinforced Backing % $Al_2O_3 \cdot 3H_2O$ in Backing | | | |
|---|---|---|---|---|
| Resin | 42.5 | 46.8 | 51.0 | 55.3 |
| 4B | 27.36 | 29.50 | 32.50 | 39.07 |
| 4A | 30.79 | 36.07 | 41.64 | 46.93 |

TABLE II

| | Smoke Density of Glass Reinforced Backing % $Al_2O_3 \cdot 3H_2O$ in Backing | | | |
|---|---|---|---|---|
| Resin | 42.5 | 46.8 | 51.0 | 55.3 |
| 4B | 2.1 | 1.2 | 0.6 | 0.7 |
| 4A | 0.0 | 0.0 | 0.0 | 0.0 |

EXAMPLE 5

A. A mixture of 18 parts of a thermoplastic polymer of MMA, ethyl acrylate (EA) and methacrylic acid (MAA) in the monomer ratio 84/12/2 dissolved in 71 parts of MMA and 3 parts MAA with 5 parts trimethylol propane trimethacrylate as cross-linking monomer, 2 parts N,N-hydroxy ethyl-p-toluidine as catalyst promoter, 0.3 parts paraffin wax and 0.005 parts hydroquinone is prepared.

B. The resin system of 4B and 5A above are mixed with various amounts of hydrated alumina and applied with 15% fiberglass to acrylic sheet and cured. The smoke density characteristics of the system of the invention as determined by D-2843 is reported in Table III.

TABLE III

| | Smoke Density of Acrylic Sheet Rigidized With Acrylic and Polyester Resin % $Al_2O_3 \cdot 3H_2O$ in Backing | | | |
|---|---|---|---|---|
| Resin | 42.5 | 46.8 | 51.0 | 55.3 |
| 4B (Comparative) | 14.1 | 21.3 | 10.7 | 9.1 |
| 5A | 2.5 | 2.2 | 1.5 | 1.8 |

EXAMPLE 6

A. A mixture of the following components with 55.3% $Al_2O_3 \cdot 3H_2O$ and 15.0% chopped fiberglass is sprayed onto the reverse side of a thermoformed acrylic bathtub.

| COMPONENT | PARTS |
|---|---|
| MMA | 46 |
| Isobutyl Methacrylate | 20 |
| MAA | 3.0 |
| P(MMA/EA/MAA) = 84.06/12.41/1.97 | 24 |
| Trimethylolpropane Trimethacrylate | 5 |
| N,N Hydroxy ethyl-p-toluidine | 2 |
| Paraffin Wax | 0.29 |
| Hydroquinone | 0.005 |
| Acetyl Peroxide | 2% (based on above) |

B. Twenty ounces of alcohol was placed in the bottom of the tub and ignited. Black smoke was not observed to be evolved when the tub became involved in the fire. A tub made with the composition of 4B was burned in a similar manner. Heavy black smoke was observed to evolve from the burning tub.

EXAMPLE 7

A. A general purpose isophthalic polyester/styrene resin gel coat was cast as a 20 mil film onto a sheet of glass and allowed to cure for 60 minutes. An acrylic resin of the following composition was prepared:

| COMPONENT | % BY WEIGHT |
|---|---|
| MMA | 70.805 |
| Methacrylic Acid | 2.910 |
| Trimethylol propane trimethacrylate | 4.849 |
| P(MMA/EA/MAA) = 85.2/12.8/2 | 18.428 |
| Paraffin Wax | 0.291 |
| Hydroquinone | 0.000048 |
| N,N Hydroxy ethyl toluidine | 2.425 |
| Terpinolene | 0.291 |

The resin was mixed with 65 parts of hydrated alumina and applied along with 15 parts of fiberglass to the gel coat. After 1.5 hours the acrylic backcoat had completely cured. The rigidized gel coated sheet was lifted from the glass after 24 hours.

B. The gel coat described in 7A was cast onto a sheet of glass giving a film of 20 mils. It was allowed to cure for 60 minutes. The polyester described in 4B was mixed with 50 parts of $Al_2O_3 \cdot 3H_2O$ and applied along with 15 parts fiberglass and allowed to cure. After 24 hours the rigidized gel coated sheet was lifted from the glass.

C. The gel coated sheets prepared in examples 7A and 7B were tested for smoke generation according to ASTM D-2843.

TABLE IV

Smoke Densities of Gel Coats Rigidized with Polyester and Acrylic Resins

| | Smoke Density |
|---|---|
| 7A | 41.0 |
| 7B | 94.3 |

I claim:
1. A composite of an acrylic substrate or gel coat coated with a cured rigidizing composition, said rigidizing system applied to at least one side of said acrylic substrate or gel coat and comprising, in its uncured state, an acrylic thermoplastic polymer dissolved in an acrylic monomer, a cross-linking monomer, hydrated alumina and fibrous reinforcement.

2. The composite of claim 1 wherein the hydrated alumina comprises about 40 to 80% by weight of the composition exculsive of reinforcement.

3. The composite of claim 1 wherein the fibrous reinforcement comprises about 10 to 25% by weight of the composition.

4. The composite of claim 1 wherein the fibrous reinforcement is chopped glass fiber.

5. The composite of claim 1 wherein the acrylic thermoplastic polymer is polymerized from a monomer system containing a minor amount of acrylic acid or methacrylic acid.

6. A method of rigidizing acrylic sheet or gel coat comprising applying to at least one side of said sheet the rigidizing composition set forth in claim 1 and curing at room temperature and atmosphere pressure.

7. The method of claim 6 wherein the composition further contains a peroxy catalyst and a catalyst promoter comprising N,N-hydroxyethyl-p-toluidine.

* * * * *